(12) United States Patent
Files et al.

(10) Patent No.: US 11,650,662 B2
(45) Date of Patent: May 16, 2023

(54) AUTOMATED DISPLAY VIEWING ANGLE ALIGNMENT

(71) Applicant: Dell Products L.P., Round Rock, TX (US)

(72) Inventors: Jace W. Files, Round Rock, TX (US); John Trevor Morrison, Round Rock, TX (US); Gerald R. Pelissier, Mendham, NJ (US)

(73) Assignee: Dell Products L.P., Round Rock, TX (US)

( * ) Notice: Subject to any disclaimer, the term of this patent is extended or adjusted under 35 U.S.C. 154(b) by 67 days.

(21) Appl. No.: 17/062,754

(22) Filed: Oct. 5, 2020

(65) Prior Publication Data

US 2022/0107684 A1  Apr. 7, 2022

(51) Int. Cl.
*G06F 3/01* (2006.01)
*G06F 1/16* (2006.01)
*G09G 5/38* (2006.01)

(52) U.S. Cl.
CPC .......... *G06F 3/013* (2013.01); *G06F 1/1681* (2013.01); *G06F 3/012* (2013.01); *G09G 5/38* (2013.01); *G09G 2320/068* (2013.01); *G09G 2354/00* (2013.01)

(58) Field of Classification Search
CPC ......... G09G 2354/00; G09G 2320/068; G09G 5/38; G06F 3/012; G06F 1/1681; G06F 3/013
See application file for complete search history.

(56) References Cited

U.S. PATENT DOCUMENTS

| | | | |
|---|---|---|---|
| 9,213,163 B2 | 12/2015 | Lewis et al. | |
| 9,268,138 B2 | 2/2016 | Shimizu et al. | |
| 9,984,507 B2 | 5/2018 | Aksoy et al. | |
| 2004/0102713 A1 | 5/2004 | Dunn | |
| 2010/0188328 A1* | 7/2010 | Dodge | G06F 3/04883 345/156 |
| 2014/0351337 A1* | 11/2014 | Pal | H04W 4/08 709/204 |
| 2015/0089440 A1* | 3/2015 | Choi | G06F 3/0488 715/863 |
| 2015/0301665 A1* | 10/2015 | Kim | G06F 1/1647 345/173 |
| 2018/0024661 A1* | 1/2018 | Lin | G09G 5/00 345/173 |

* cited by examiner

*Primary Examiner* — Abbas I Abdulselam
(74) *Attorney, Agent, or Firm* — Zagorin Cave LLP; Robert W. Holland

(57) ABSTRACT

A portable information handling system rotates a lid housing portion integrating a display from a closed to an open position with a motorized hinge. One or more sensors monitor an end user position during the rotating from the closed to the open position so that the motorized hinge aligns the display with a desired viewing position relative to the end user, such as substantially perpendicular to the end user's gaze. The one or more sensors monitor the end user during usage of the information handling system to adjust the motorized hinge as the end user's position changes relative to the display over time.

9 Claims, 5 Drawing Sheets

AUTOMATED DISPLAY VIEWING ANGLE ALIGNMENT

BACKGROUND OF THE INVENTION

Field of the Invention

The present invention relates in general to the field of portable information handling systems, and more particularly to an automated display viewing angle alignment.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable information handling systems integrate processing components, a display and a power source in a portable housing to support mobile operations. Portable information handling systems allow end users to carry a system between meetings, during travel, and between home and office locations so that an end user has access to processing capabilities while mobile. Convertible configurations typically include multiple separate housing portions that rotationally couple to each other so that the system converts between closed and open positions. For example, a main housing portion integrates processing components and a keyboard and rotationally couples with hinges to a lid housing portion that integrates a display. In a clamshell position, the lid housing portion rotates approximately ninety degrees to a raised position above the main housing portion so that an end user can type inputs while viewing the display. After usage, convertible information handling systems rotate the lid housing portion back to a closed position over the main housing portion to protect the keyboard and display, thus reducing the system footprint for improved storage and mobility.

One recent innovation by DELL is to include a motorized hinge in a portable information handling system that automatically opens and closes the housing. Automated opening and closing of the housing provides an enhanced end user experience that prepares the system for end user interactions and completes the system when end user interactions are completed. For instance, an end user presses a push button that activates the motor to open at system power up. As the operating system boots, the lid housing portion automatically lifts to a raised position so that the display is positioned for viewing by an end user. Once the end user completes interactions and powers off the system, the lid housing portion automatically closes to place the system in a portable configuration. Although automated opening of the lid housing portion provides end user convenience, such as by allowing the end user to prepare work while the information handling system boots and opens, portable information handling systems may be used in a wide variety of environments, such as resting on a desk or an end user lap, so that an automated opening operation to a defined orientation may leave the display offset from the end user. Generally, displays present visual images to end users most clearly when the end user is viewing the display from a substantially perpendicular viewing angle. As the end user viewing angle varies from perpendicular, visual images presented at the display tend to appear less clear and with reduced contrast and color. Thus, even with an automated lid housing portion opening, an end user tends to still have to interact with the lid housing portion to adjust the display viewing angle based upon the end position relative to the display.

SUMMARY OF THE INVENTION

Therefore, a need has arisen for a system and method which automatically adjusts a portable information handling system hinge orientation based upon a sensed position of an end user of the system.

In accordance with the present invention, a system and method are provided which substantially reduce the disadvantages and problems associated with previous methods and systems for adjusting a portable information handling system housing orientation relative to an end user position. One or more sensors sense an end user position while a motorized hinge opens a portable housing to rotate the housing to a position at which the display has a desired viewing position relative to the end user, such as with the display substantially perpendicular to the end user field of view.

More specifically, an information handling system processes information with processing components disposed in a portable housing and presents the information as visual images at a display integrated in the portable housing. The portable housing has first and second housing portions rotationally coupled to each other with a motorized hinge that rotates the housing portions relative to each other between closed and open positions. A hinge controller module interfaces with plural sensors to determine an end user position relative to the information handling system and manages the hinge rotational orientation based upon the end user's sensed position, such as to cease rotation from the closed to an open position when a display integrated in the housing has a substantially perpendicular orientation relative to a viewing angle of the end user. In one example embodiment, the hinge controller monitors end user position during interactions with the information handling system to adjust the display orientation relative to the end user field of view as the end user moves. Although a variety of position sensors may be used, eye gaze sensors in particular provide an accurate estimate of the end user field of view and allow adjustments to display orientation while an end user's attention is not focused on the display.

The present invention provides a number of important technical advantages. One example of an important technical advantage is that an information handling system housing rotational orientation automatically adapts to an end user position to align a display with a desired viewing position relative to the end user. An end user is provided with an optimal viewing angle for a portable display by automated adjustment of a housing motorized hinge based upon a sensed end user eye gaze. As the end user position shifts relative to the display, automated adjustments are provided to the housing orientation so that the end user maintains an optimal viewing angle. These adjustments may be performed automatically with the motorized hinge and an eye gaze sensor so that movements are performed when the end user is not focused on the display. Other manual adjustments may be performed based upon gesture inputs made by the end user and sensed at the housing, such as with an ultrasound sensor.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A portable information handling system motorized hinge aligns a display to an end user field of view based on a sensed relative position of the display and end user. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
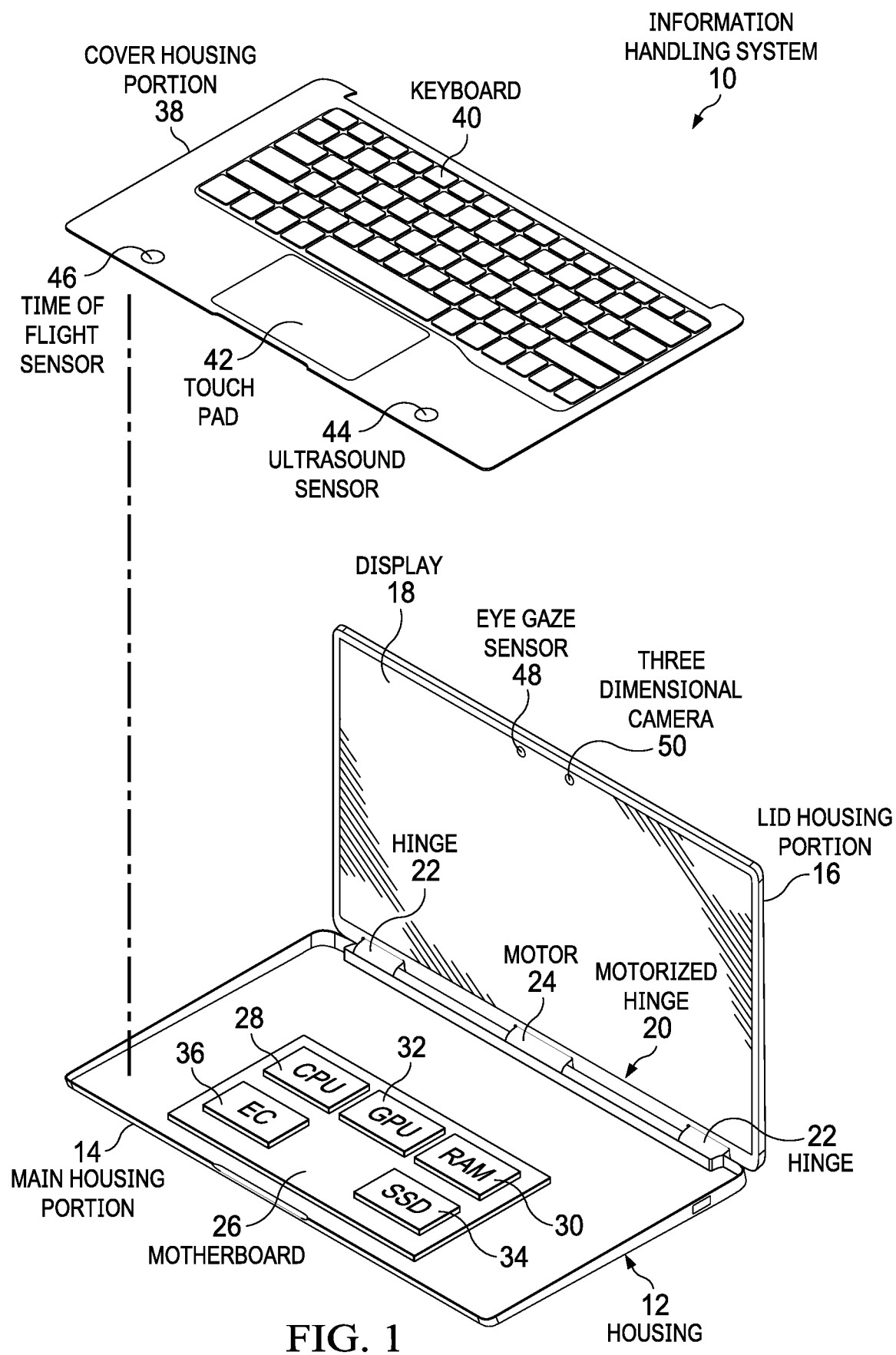
FIG. 1 depicts an exploded perspective view of an information handling system configured to automatically manage display viewing angle alignment with hinge rotational orientation adjusted by a motorized hinge.

Referring now to FIG. 1, an exploded perspective view depicts an information handling system 10 configured to automatically manage display 18 viewing angle alignment with hinge rotational orientation adjusted by a motorized hinge 20. Information handling system 10 is built in a portable housing 12 having a main housing portion 14 rotationally coupled to a lid housing portion 16 by a motorized hinge 20. Main housing portion 14 rests on a support surface so that lid housing portion 16 rotates from a closed position to an open position having display 18 integrated in lid housing portion 16 held in a vertical orientation for viewing by an end user. Motorized hinge 20 has hinge elements 22 interfaced with a motor 24 that rotates main housing portion 14 and lid housing portion 16 relative to each other between closed an open positions. Main housing portion 14 contains processing components that cooperate to process information and present the information as visual images at display 18. In the example embodiment, a motherboard 26 couples to main housing portion 14 and integrates wirelines that provide communication between processing components. For instance, a central processing unit (CPU) 28 couples to motherboard 26 and executes instructions that process information, such as instructions of an operating system and applications. A random access memory (RAM) 30 interfaces with CPU 28 to store the instructions and information. A graphics processor unit (GPU) 32 interfaces with CPU 28 to further process information and define visual images as pixel values presented at display 18. A solid state drive (SSD) 34 provides persistent storage of instructions and information in non-transient memory, such as flash, for retrieval to RAM 30 from a power down state. An embedded controller 36 manages physical operations at motherboard 26, such as application of power, thermal conditions and interactions with input/output devices.

Information handling system 10 has a cover housing portion 38 that couples over main housing portion 14 to cover the processing components and to support a keyboard 40 and touchpad 42, which accept inputs from an end user for communication to embedded controller 36. In the example embodiment, plural sensors couple to various parts of housing 12 to provide inputs to embedded controller 36 and/or CPU 28. For instance, ultrasound sensor 44 integrates in a palm rest area of cover housing portion 38 to detect proximity and motion with ultrasonic sound wave detection, such as with Doppler effects. A time of flight sensor (TOF) 46 integrates in the palm rest area of cover housing portion 38 to detect proximity and user presences with infrared illumination time of flight detection. An eye gaze sensor 48 integrates in lid housing portion 16 to detect end user eye gaze, such as with the differential response of infrared reflection at an end user's eye cornea. A three dimensional camera 50, also known as a depth camera, measures distances to an object based upon infrared reflection to determine a shape of an object, such as an end user head versus body. In various embodiments, the plural sensors may be disposed at different locations of housing 12 to provide detection along a desired field of view, such as with housing 12 closed, open or in a tent or tablet configuration. For instance, sensors disposed in main housing portion 14 will generally have a consistent field of view relative to an end user while the end user rotates lid housing portion 16 open; and sensors disposed in lid housing portion 16 will generally have a changing field of view as lid housing portion 16 rotates up and away from main housing portion 14 in the closed position towards the open position.

In the example embodiment, an orientation of lid housing portion 16 relative to main housing portion 14 is established by motorized hinge 20 based upon commands sent to motorized hinge 20 from embedded controller 36. For instance, at power up of information handling system 10 in response to a power button press, embedded controller 36 commands rotation of lid housing portion 16 from a closed position in proximity to main housing portion 14 to an open position raised above main housing portion 14. In the raised position, lid housing portion 16 holds display 18 in a vertical orientation that provides viewing of presented visual images to an end user. Instructions executing on embedded controller 36 determine a rotational orientation at which to cease rotation by motorized hinge 20 based upon sensed information of end user location. For example, embedded controller 36 commands stopping of rotation of motorized hinge 20 when eye gaze sensor 48 detects an end user eye gaze in a central location relative to display 18. As another example, a three dimensional camera 50 detects shapes and positions, such as an end user head, so that motorized hinge 20 stops rotation when the end user head is in a central location. Similarly, time of flight sensor 46 and ultrasound sensor 44 detect end user position based upon a scan pattern so that an alignment of the end user head and/or eyes with the display may be estimated to cease hinge movement. In various embodiments, other types of sensors may be used, and multiple sensor detections may be applied to further enhance end user detection accuracy. Further, the sensors may be located in various locations of housing 12. In one example embodiment, if an end user is not detected during motorized hinge 20 rotation, a default rotational orientation may be used, such as based upon historical rotational orientations in which an end user was detected and a desired rotational orientation selected based upon sensor detection.

Once motorized hinge 20 has stopped rotating with display 18 aligned for optimal viewing by a detected end user position, changes of the end user position may be detected so that housing rotational orientation is adjusted to maintain a desired end user display viewing orientation. For instance, if an eye gaze sensor detects that the end user eye gaze has left a central field of view, a command to the motorized hinge may be provided that rotates the motorized hinge to bring the display to a position having the eye gaze in the central location. In addition, gestures by an end user, such as predefined hand motions detected by ultrasound sensor 44, may be used to adjust the housing orientation as commands to the motorized hinge from the embedded controller.

Figure 2:
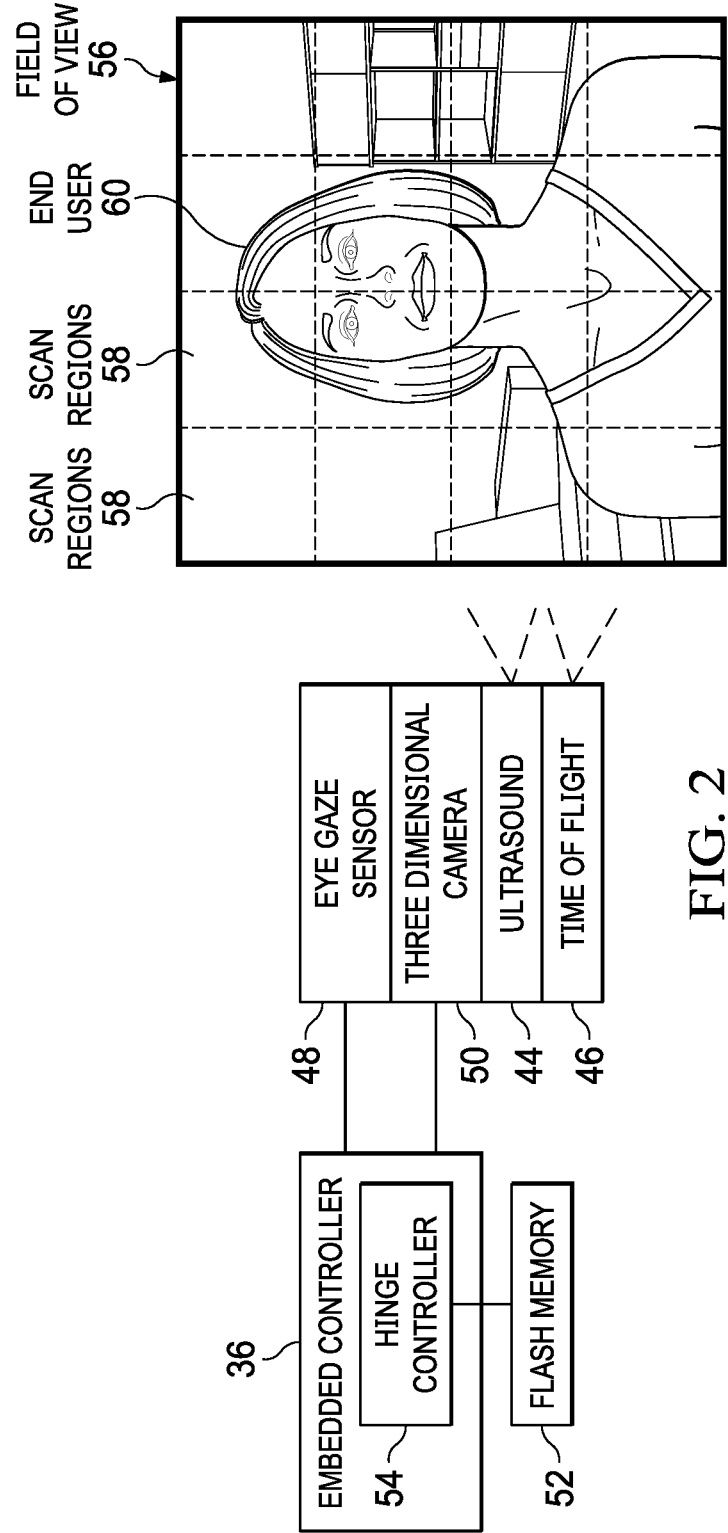
FIG. 2 depicts a block diagram of a system that manages display viewing angle with hinge rotational orientation based upon sensed conditions associated with an end user.

Referring now to FIG. 2, a block diagram depicts a system that manages display viewing angle with hinge rotational orientation based upon sensed conditions associated with an end user. In the example embodiment, a hinge controller 54 is stored in non-transitory flash memory 52 of embedded controller 36 to execute as instructions that command movement of a motorize hinge. Embedded controller 36 interfaces with plural sensors that separately or in a coordinated fashion determine a position of an end user relative to a housing portion and integrated display having a rotational orientation determined by the motorized hinge. In the example embodiment, the plural sensors include an eye gaze sensor 48, a three dimensional camera 50, an ultrasound sensor 44 and a time of flight sensor 46. Each sensor has a field of view 56 in which it captures sensed information, and scan regions 58 that define a location of the field of view in which a sensed item is located. When a sensor is integrated in a lid housing portion, a desired display orientation relative to an end user may be determined when an end user's eyes are located in a scan region associated with a substantially perpendicular or other display relationship. As the display rotates to the perpendicular relationship, hinge controller 54 can track the eye position moving through scan regions 58 to estimate when a desired display orientation is met. When a sensor is located in the main housing portion, a rotational orientation for the desired display alignment may be estimated from the scan region 58 in which the end user eyes are detected.

Figure 3:
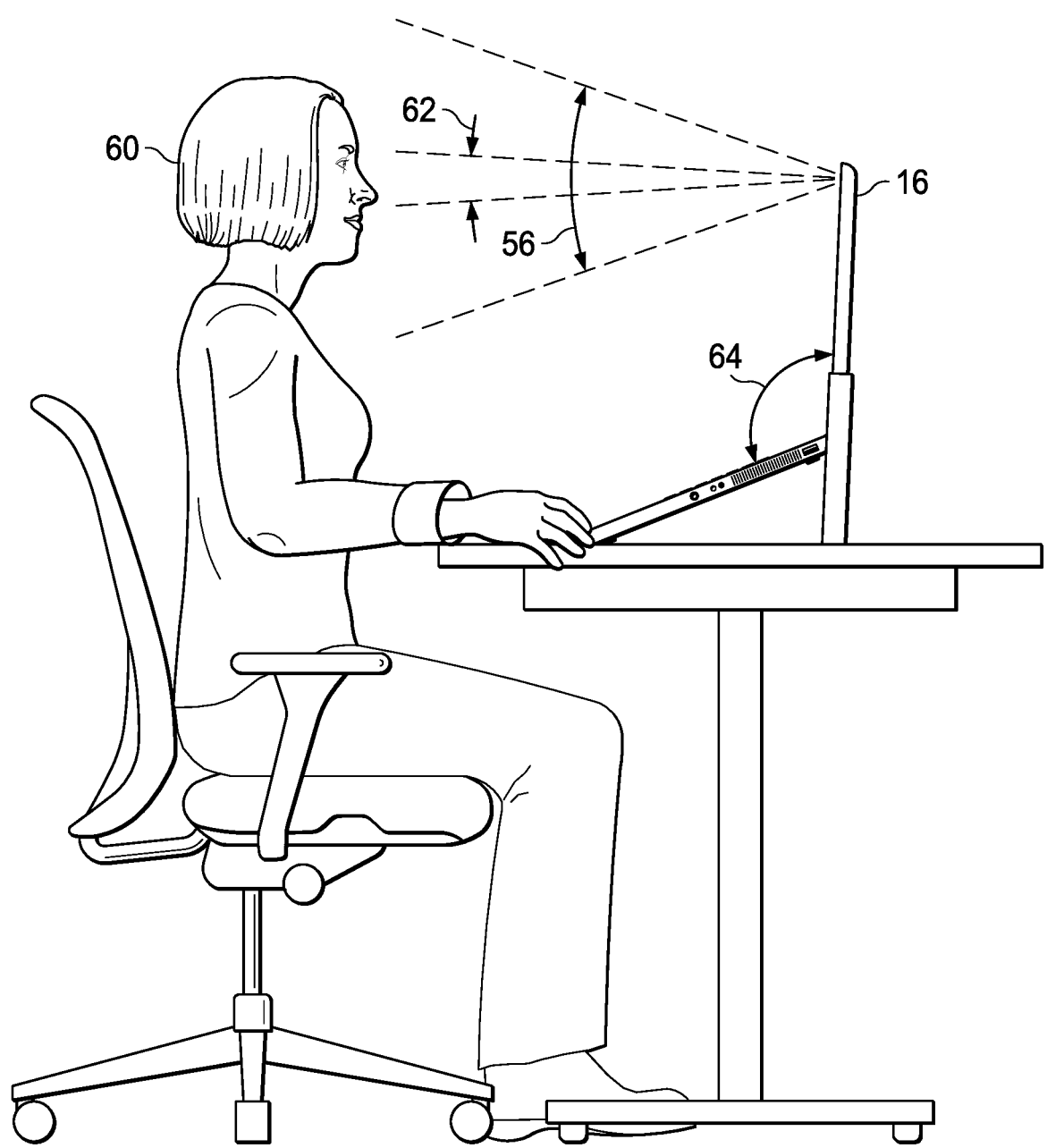
FIG. 3 depicts an end user viewing an information handling system display automatically adjusted based upon field of view.

Referring now to FIG. 3, an end user 60 is depicted viewing an information handling system 10 and the display 18 automatically adjusted based upon field of view. In the example embodiment, lid housing portion 16 integrates a camera, such as an eye gaze sensor or a three dimensional camera, with a camera field of view 56. As a hinge angle 64 increases and raises camera field of view 56 upwards relative to end user 60, a central field of view 62 aligns with eye level of end user 60 to indicate a normal or substantially perpendicular viewing orientation of end user 60 relative to display 18. In various embodiments, the viewing angle at which rotational movement is stopped may be offset from a perpendicular angle, such as to optimize view for ambient light where an end user image perception may prove better with some offset.

Figure 4:
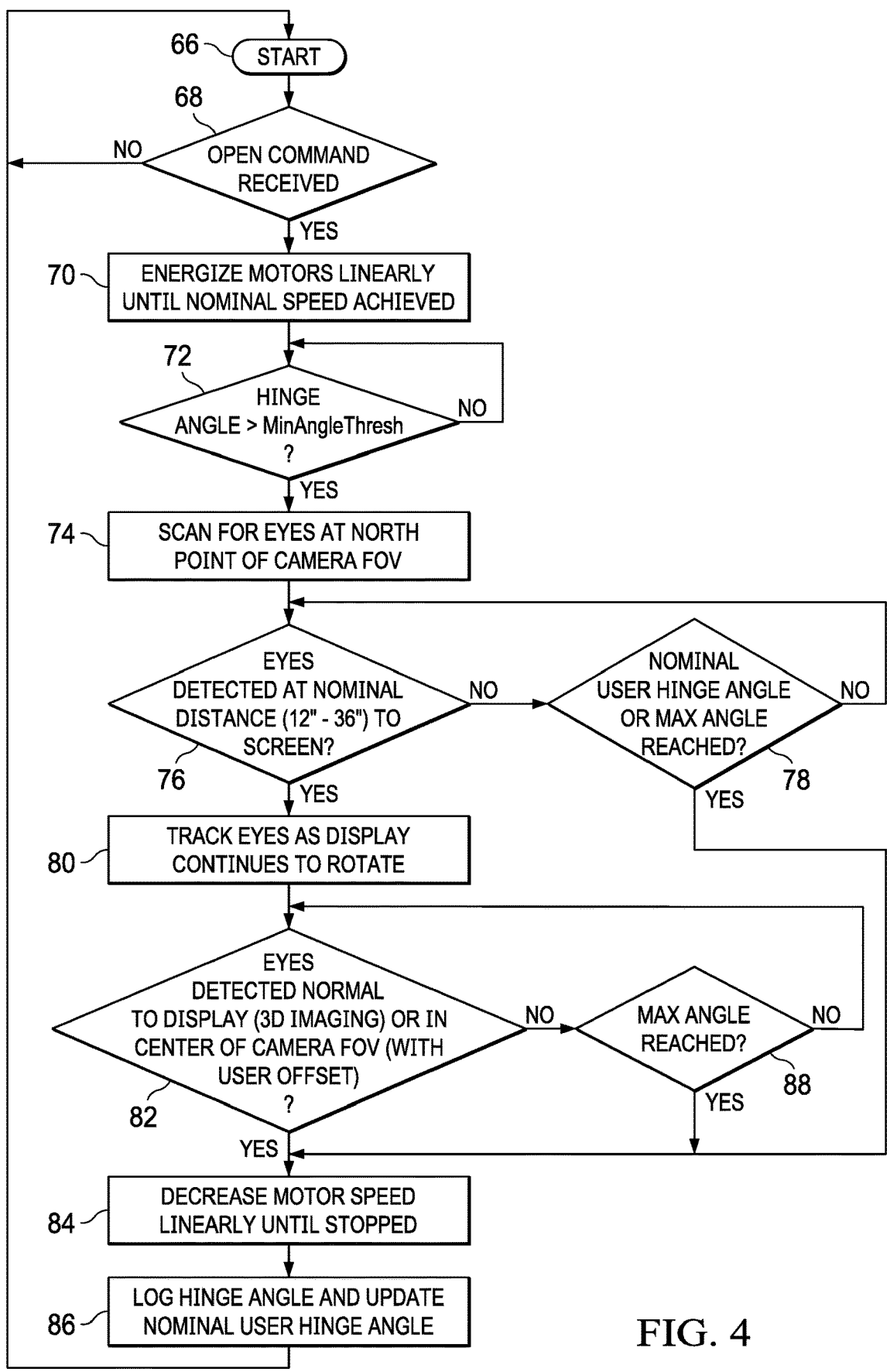
FIG. 4 depicts a flow diagram of a process for automated opening of an information handling system housing to a desired viewing angle.

Referring now to FIG. 4, a flow diagram depicts a process for automated opening of an information handling system housing to a desired viewing angle. The process starts at step 66 and continues to step 68 to determine if a command was provided to open the housing, such as by a press at a button on the housing when in a closed position. If not the process returns to step 66 to continue monitoring for a button input. Once a command to open the housing is received, the process continues to step 70 to energize the motorized hinge linearly until a nominal speed of rotation is achieved. At step 72, the hinge angle is monitored until a minimum hinge rotation angle threshold is achieved. For instance, the minimum angle threshold is a minimum rotation angle at which the display is viewable by an end user and/or a minimum rotation angle at which a sensor is capable of detecting an end user eye position. Upon reaching the minimum threshold, the process continues to step 74 to initiate scanning for an end user gaze in the upper field of view of the eye gaze sensor camera field of view. At step 76, a determination is made of whether end user eyes are detected at a nominal distance to the display, such as from 12 to 36 inches. If end user eyes are not detected, the process continues to step 78 to determine if a nominal end user hinge angle or a maximum hinge angle has been reached. If not, the process returns to step 76 to continue monitoring for detection of end user eyes. If a nominal rotation angle or maximum angle is achieved at step 78, the process continues to step 84 as described below.

Once end user eye gaze is detected at step 76, the process continues to step 80 to track the eye position as the housing rotates. At step 82 a determination is made of whether the eye position is substantially perpendicular or normal to the display for a preferred viewing orientation. If not, the process continues to step 88 to determine if a maximum viewing angle is reached. If the maximum viewing angle is not reached, the process returns to step 82 to continue monitoring the eye position. If the maximum angle is reached at step 88 or the preferred viewing orientation is reached at step 82, the process continues to step 84 at which the motorized hinge motor speed is decreased linearly until housing rotation is stopped. Once housing rotation has stopped, the process ends at step 86 by logging the hinge position and updating the nominal user hinge angle as a reference to use when the hinge rotation occurs without detecting an end user or eye position.

Figure 5:
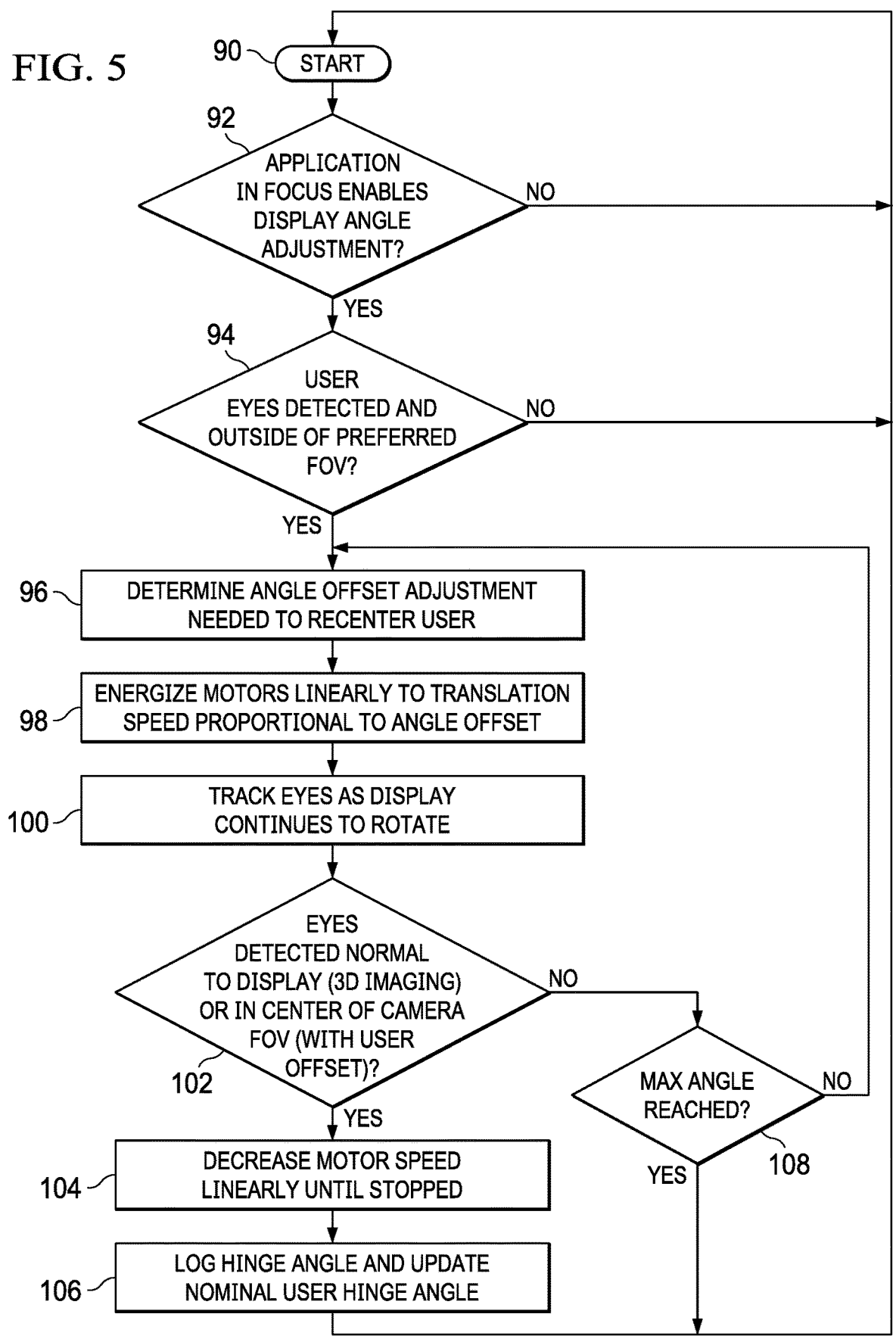
FIG. 5 depicts a flow diagram of a process for automated adjustment of an information handling system housing to a desired viewing angle responsive to end user movements.

Referring now to FIG. 5, a flow diagram depicts a process for automated adjustment of an information handling system housing to a desired viewing angle responsive to end user movements. The process starts at step 90 with the information handling system presenting visual images to an end user that are generated by an application, such as a word processor, a movie play, a web browser, etc. . . . . . At step 92, a determination is made of whether the application presenting visual images is associated with display viewing angle adjustments. If not, the process returns to step 90 to continue monitoring the application that is presenting visual images. If the application allows display viewing angle adjustments at step 92, the process continues to step 94 to determine if the end user eye gaze position is detected outside of the preferred field of view. If not, the process returns to step 90 to continue monitoring end user eye gaze position. If the end user eye gaze is outside of the preferred field of view, the process continues to step 96 to determine the angle offset adjustment needed to re-center the end user field of view on the display, such as by comparing an end user gaze position and display orientation. At step 98, the motorized hinge is activated linearly to a translation speed proportional to the angle offset, such as with proportional control based on rotation distance and current speed. Alternatively, proportional control may be used with a proportional-integral-derivative (PID) control system. In one embodiment, end user movement may be continuously adjusted for so that the display orientation adjusts in real time. The optimal angle for display orientation can be learned and customized by the user based upon user offsets measured over time. In one example embodiment, eye gaze position may be used so that the end user is not focused on the display when display orientation changes are performed, thereby hiding actual hinge movement from the end's attention.

Once the motorized hinge starts housing rotation, the process continues to step 100 where eye gaze position is tracked as the display rotates due to housing rotation. At step 102, a determination is made of whether the end user eye position relative to the display has achieved a desired orientation, such as a substantially normal viewing angle based upon three-dimensional imaging or an eye gaze position in a central position of the camera field of view. If a substantially normal viewing angle is not established, the process continues to step 108 to determine if a maximum rotational orientation angle has been reached. If so, the process returns to step 90 with rotation stopped at the maximum angle. If not, the process continues to step 96 to determine that needed angle offset to reach the substantially normal viewing angle. If at step 102 the end user's eye position has achieved the substantially normal orientation, the process continues to step 104 to decrease the motor speed linear until housing rotation has stopped. At step 106 the hinge angle is logged and the nominal user hinge angle is updated for use during subsequent housing rotational orientation adjustments, such as where rotational orientation is changed without detection of an end user in the field of view.

Although the present invention has been described in detail, it should be understood that various changes, substitutions and alterations can be made hereto without departing from the spirit and scope of the invention as defined by the appended claims.

What is claimed is:

1. An information handling system comprising:
    a housing having first and second housing portions;
    a motorized hinge rotationally coupling the first and second housing portions the motorized hinge operable to rotate the first and second housing portions relative to each other between a closed position and an open position;
    a processor disposed in the housing and operable to execute instructions that process information;
    a memory disposed in the housing and interfaced with the processor, the memory operable to store the instructions and information;
    a display integrated in the second housing portion and interfaced with the processor to present the information as visual images;
    one or more sensors disposed in the housing, the sensor operable to determine a position of an end user relative to the second housing portion; and
    a controller interfaced with the motorized hinge and the one or more sensors, the controller responding to a command to rotate the housing from a closed position to an open position by initiating rotation of the second housing portion to a raised position over the first housing portion until the one or more sensors determine a predetermined position of the second housing portion relative to an end user.

2. The information handling system of claim 1 wherein:
    the one or more sensors comprise an eye tracking sensor operable to track eye gaze of the end user; and
    the predetermined position of the second housing portion comprises a substantially perpendicular alignment of the end user eye gaze and the display.

3. The information handling system of claim 1 wherein:
    the one or more sensors comprise a three-dimensional camera operable to detect the end user head; and
    the predetermined position of the second housing portion comprises a substantially perpendicular alignment of the end user head and the display.

4. The information handling system of claim 1 wherein:
    the one or more sensors comprises an ultrasound sensor operable to detect the end user proximity.

5. The information handling system of claim 1 wherein:
    the one or more sensors comprises a time of flight sensor.

6. The information handling system of claim 1 wherein the one or more sensors integrate in the second housing portion.

7. The information handling system of claim 1 wherein the one or more sensors integrated in the first housing portion.

8. The information handling system of claim 1 wherein the controller is further operable to monitor the end user position and initiate rotation of the motorized hinge to adjust housing orientation based upon changes of the end user position.

9. The information handling system of claim 8 wherein the controller manages motorized hinge operation to adjust the housing orientation with movement performed when the end user is not looking at the display.

* * * * *